A. RITTENHOUSE.
Harness.
No. 208,636. Patented Oct. 1, 1878.
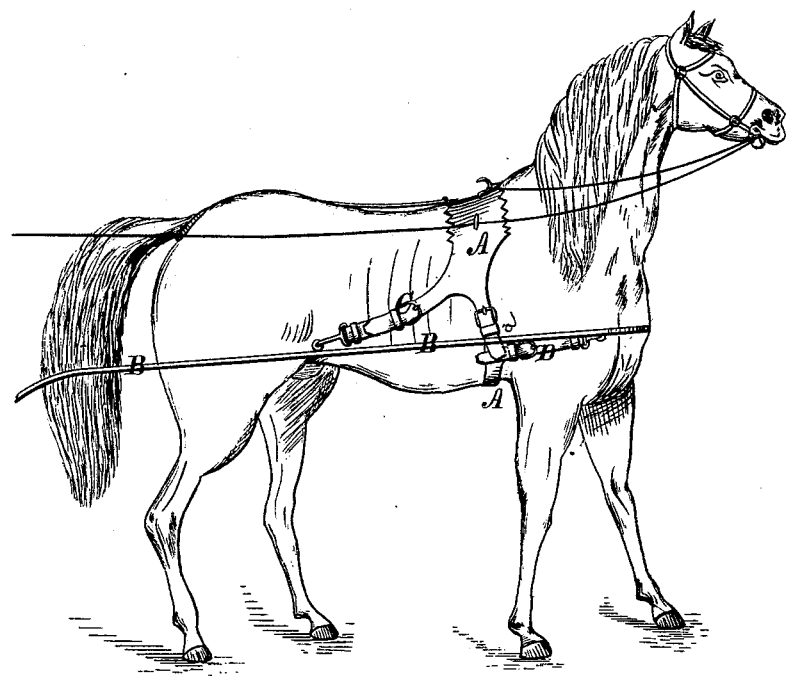
WITNESSES:
Jas. E. Hutchinson.
Henry C. Hazard.
INVENTOR.
A. Rittenhouse, by
Prindle & Co, his Attys

UNITED STATES PATENT OFFICE.

ALVAH RITTENHOUSE, OF PHILADELPHIA, PENNSYLVANIA.

IMPROVEMENT IN HARNESS.

Specification forming part of Letters Patent No. 208,636, dated October 1, 1878; application filed August 22, 1878.

*To all whom it may concern:*

Be it known that I, ALVAH RITTENHOUSE, M. D., of Philadelphia, in the county of Philadelphia, and in the State of Pennsylvania, have invented certain new and useful Improvements in Harness; and do hereby declare that the following is a full, clear, and exact description thereof, reference being had to the accompanying drawing, making a part of this specification, in which is shown, in perspective, a horse connected to or with a carriage by means of my improved apparatus.

In utilizing the strength of horses for the draft of vehicles it has heretofore been the custom to throw the whole strain upon the chest by means of a breast-strap or collar, which passed horizontally around the same, and was connected to or with the traces, or upon the breast and shoulders by use of a collar which encircled the neck and bore upon said parts, and to which the traces were attached. Each of the means named has proved objectionable, however, in consequence of their interference with the freedom of motion of the shoulders and of the unnatural compression of the lungs.

To remedy these objections is the design of my invention, which consists, principally, as a means for connecting a horse to or with a vehicle, in a girth, which encircles the body of said horse, and traces, that are connected with said girth, and extend rearward and downward to and are connected with the shafts, substantially as and for the purpose specified.

It consists, further, in the harness as a whole, its several parts being combined to operate in the manner and for the purpose substantially as hereinafter set forth.

In the annexed drawing, A represents a girth, which passes loosely around and is secured upon the body of a horse by means of a buckle and strap, and is provided with loops *a,* that receive and sustain the forward ends of the shafts B, all in the usual manner. Attached to each side of the girth A, at a point above the usual level of the shafts B, is a trace, C, which from thence extends rearward and downward, and is connected with the shaft at a point, preferably, midway between said girth and the buttock of the horse.

A strap, D, is attached to each side of the girth A at a point below the shafts B, and extends forward and upward, with its forward end connected to or with said shaft.

The harness is now complete and operates as follows: When the horse moves forward the strain of each trace is both downward and rearward, and operates upon the girth by drawing it firmly around the body of the horse, so as to prevent said girth from slipping rearward, the greater the strain thrown upon said traces the more firmly the said girth being caused to embrace the horse.

When the horse is moving backward, or is resisting the forward movement of the carriage upon a hill, the whole strain is thrown upon the girth by the holdback-straps D, which operate in the same manner as the traces, by causing said girth to firmly clasp the body of the horse, and thus furnish a secure attachment for said straps.

By use of this harness all of the strain is thrown upon the horse at a point where it is best able to sustain the same, while, as the muscles of its limbs and chest are left entirely free, the horse moves forward or backward with the same ease as though disconnected from the vehicle.

For horses used with carriages the girth will never be drawn more closely by the operation of the traces or holdback-straps than are the girths of ordinary harness as usually applied.

Having thus fully set forth the nature and merits of my invention, what I claim as new is—

1. As a means for connecting a horse to or with a vehicle, a girth, A, which encircles the body of said horse, and traces C, that are connected with said girth, and extend rearward and downward to and are connected with the shafts B, substantially as specified.

2. The hereinbefore-described harness, consisting of the girth A, which encircles the body of the horse, the traces C, that extend from said girth downward and rearward to the shafts B, and the holdback-straps D, which extend from said girth forward and upward to said shafts, said parts being combined to operate in the manner and for the purpose substantially as set forth.

In testimony that I claim the foregoing I have hereunto set my hand this 17th day of January, 1877.

ALVAH RITTENHOUSE, M. D.

Witnesses:
JOHN T. JOHNSON,
GEO. S. RITTENHOUSE.